United States Patent [19]
Greene

[11] 3,946,394
[45] Mar. 23, 1976

[54] FIXED BEAM RADAR WITH RANGE LIGHT DISPLAY

[75] Inventor: Leonard M. Greene, Chappaqua, N.Y.

[73] Assignee: Safe Flight Instrument Corporation, White Plains, N.Y.

[22] Filed: May 17, 1974

[21] Appl. No.: 471,349

[52] U.S. Cl. ............................................. 343/13 R
[51] Int. Cl.² ........................................... G01S 9/06
[58] Field of Search ...................... 343/12 SB, 13 R

[56] References Cited
UNITED STATES PATENTS

| | | | |
|---|---|---|---|
| 3,035,262 | 5/1962 | Vantine, Jr. | 343/13 R X |
| 3,087,151 | 5/1963 | Vantine, Jr. | 343/13 R X |
| 3,134,975 | 5/1964 | Goodman | 343/13 R X |
| 3,173,137 | 3/1965 | Byrne | 343/6.5 R |
| 3,229,203 | 1/1966 | Minohard | 343/13 R X |
| 3,229,245 | 1/1966 | Hurdle et al. | 343/13 R X |
| 3,824,592 | 7/1974 | Mehltretter | 343/13 R |

Primary Examiner—Malcolm F. Hubler
Attorney, Agent, or Firm—Edward A. Sokolski

[57] ABSTRACT

A radar principally for use on small vehicles such as sail boats, utilizing a fixed antenna which provides a continuously forward looking beam and which provides a range display only. Utilizing digital techniques, the video representing radar echoes is gated in proper time sequence corresponding to target range to a series of indicator lights. These indicator lights each represent a different target range, and thus provide a display indicating the range at which various targets forward of the vehicle are located.

7 Claims, 6 Drawing Figures

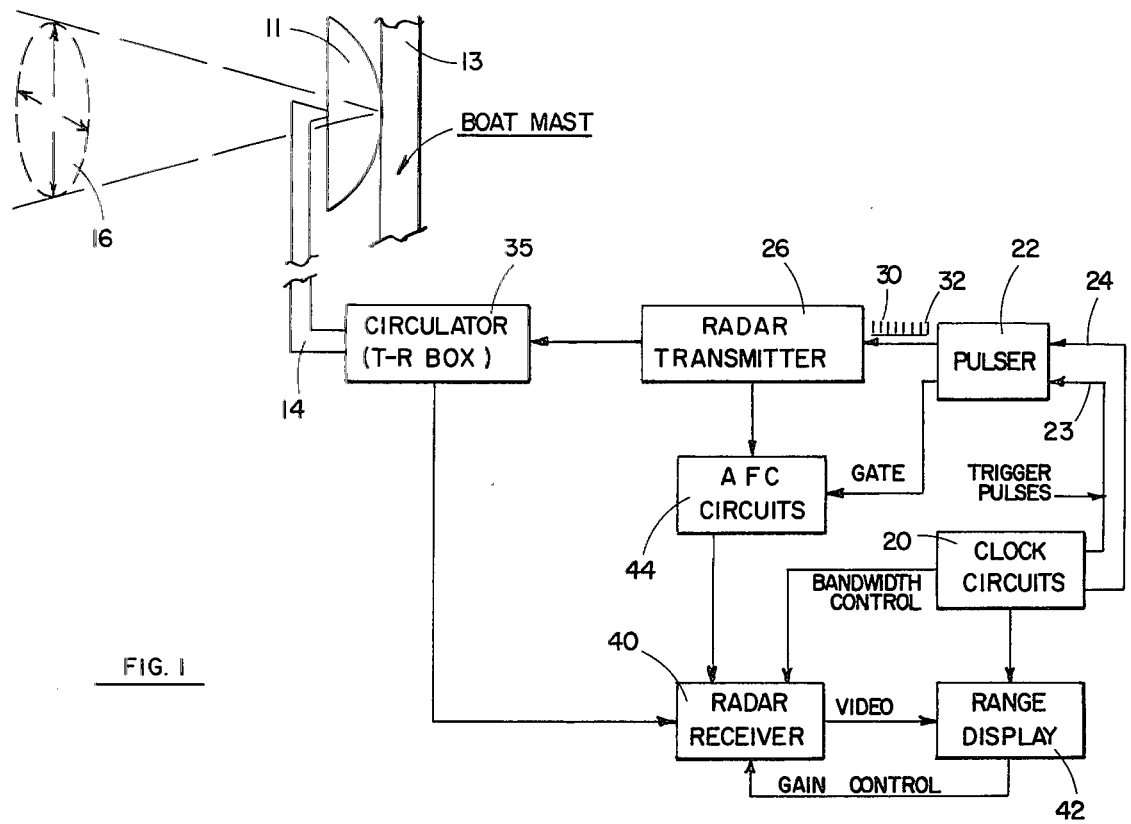
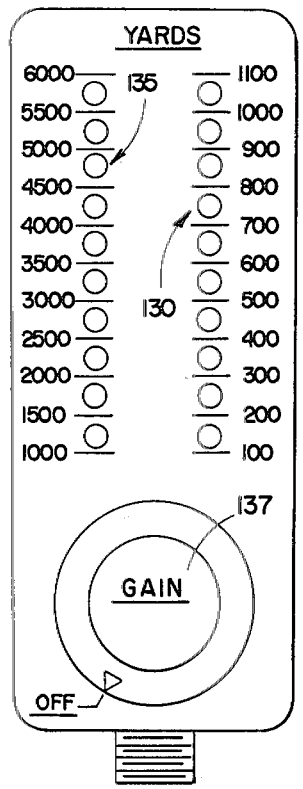
FIG. 1
FIG. 5

FIXED BEAM RADAR WITH RANGE LIGHT DISPLAY

This invention relates to radar equipment, and more particularly to such equipment utilizing a fixed antenna beam and providing a light display indicating target range.

In radar equipment for use on small vehicles such as sailboats, several requirements must be satisfied. First, the equipment must have low power drain in view of the limited power available on such vehicles. Also, the equipment (including the antenna) must be lightweight and compact in construction, in view of vehicle limitations along these lines. Further, the device must be of relatively low cost to be salable, particularly to private owners. In addition, for use on a sailboat, the control and display unit must be small and rugged and the display must be easily readable in daylight so that it can be used on an open deck portion of the boat.

Prior art radar equipments are generally too bulky and heavy and expensive in their construction to satisfy the aforementioned requirements for use on small vehicles such as sailboats. A scanning type radar is unsuitable in view of the size, weight and expense of a scanning antenna unit as well as the accompanying scanning cathode ray tube display (PPI). Further, due to the heeling characteristics of a sailboat, scanning type operation presents distinct problems in that targets (particularly those abeam of the boat) may be missed during a scan in view of the boat's heeling motion.

The device of the present invention provides a radar particularly useful in small vehicles such as sailboats which uniquely satisfies the requirements of this type of application and thus overcomes the aforementioned shortcomings of the prior art radars in this regard. This end result is accomplished by utilizing a fixed antenna which provides a forward-looking beam which operates to provide a simple range display and without any requirement for a cathode ray tube for this purpose. The elimination of a cathode ray tube display and the antenna rotator accounts for a large reduction in power drain. Further, the elimination of a rotator for the antenna makes for a very lightweight antenna unit for mounting on a sailboat mast with the obvious advantages. The device of the invention utilizes an indicator lamp bank display for indicating range that can be readily seen in broad daylight, thus obviating the problems encountered with the low illumination inherent in cathode ray tube radar displays.

It is therefore an object of this invention to provide a simple economical lightweight radar equipment suitable for use on vehicles such as sailboats.

It is a further object of this invention to provide a simple lightweight radar which utilizes a fixed, forward-looking antenna beam and eliminates the need for a cathode ray tube.

It is still a further object of this invention to provide a simple radar which provides a range display comprising a bank of lamps that can be viewed in daylight.

A further object of this invention is to provide a decorrelation of sea reflections through the use of a fixed forward-pointing antenna, thus improving the ability of the radar to detect small objects in the presence of sea reflections.

Other objects of this invention will become apparent as the description proceeds in connection with the accompanying drawings, of which:

FIG. 1 is a functional block diagram of a preferred embodiment of the invention;

FIg. 5 is a pictorial view illustrating the control unit that may be utilized in the preferred embodiment of the invention.

Briefly described, the invention comprises a fixed radar antenna which radiates a conical beam in the direction towards which the sailboat or other vehicle on which the equipment is installed is travelling. Clock circuits are utilized to generate trigger pulses of a shorter and longer duration for producing suitable echoes from shorter and longer distance targets respectively. These trigger pulses, which are synchronized with a master clock, are fed to a pulser circuit which operates to pulse the radar transmitter, the shorter and longer pulses being multiplexed together. The pulsed RF output of the transmitter is fed to the radar antenna and radiated thereby. Return echoes from targets are received by means of the radar receiver, the video signals detected by the receiver being fed to a range display. This range display comprises a light bank which may be formed by light emitting diodes, incandescent lamps or gas discharge lamps, each lamp in the bank representing a different target range bracket. Counter and decoder circuits which are synchronized with the clock circuit utilized to generate the trigger pulses, provide sequential gating signals, each gating signal representing a different target range as determined by its timing reference to either the shorter or longer radar trigger pulses, as the case may be. A separate gate is provided for each of the lamps in the light display bank. The radar video echo signals are fed in parallel to all of the gates and are gated through these gates to actuate the various lamps in response to the gating signals fed thereto from the decoder circuits. Thus, the lamps are actuated to indicate the ranges of targets within the beam of the radar.

Figure 4:
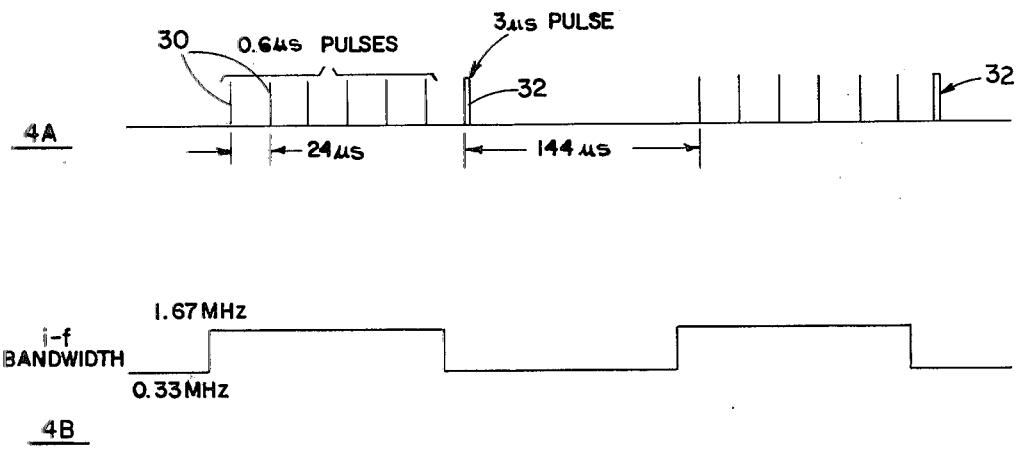
FIGS. 4A and 4B are timing diagrams illustrating certain pulses generated in the circuitry illustrated in FIG. 2.

Referring now to FIG. 1, the system of the invention is schematically illustrated. Radar antenna 11 which may be of the parabolic reflector type, is fixedly mounted on boat mast 13. Radio frequency energy is fed to the antenna by means of the wave guide 14, the antenna radiating a fixed conical beam as indicated at 16. Clock circuits 20, as will be explained in detail further on in this specification, generate shorter and longer trigger pulses which are fed to pulser 22 on lines 23 and 24 respectively. Pulser 22 which comprises conventional radar transmitter pulsing circuits, provides a drive signal for radar transmitter 26, this drive signal comprising a train of shorter duration closer spaced pulses 30 and a train of longer duration wider spaced pulses 32 as shown in FIG. 4A, these pulses being multiplexed together. The output of radar transmitter 26 pulsed as illustrated in FIG. 4A is fed through a ferrite circulator 35 to wave guide 14 for radiation by antenna 11. Echoes received by the radar are fed through wave guide 14 and circulator 35 to radar receiver 40. The video output of radar receiver 40 which comprises the radar echoes, is fed to range display 42 for use in actuating the range display lamps, as to be explained further in connection with FIG. 2. Automatic frequency control is provided for radar receiver 40 by means of AFC circuits 44.

The radar circuitry including antenna 11, circulator 35, radar transmitter 26, pulser 22, radar receiver 40 and AFC Circuit 44, may be of conventional design well known to those skilled in the art and therefore need not be explained further.

Figure 2:
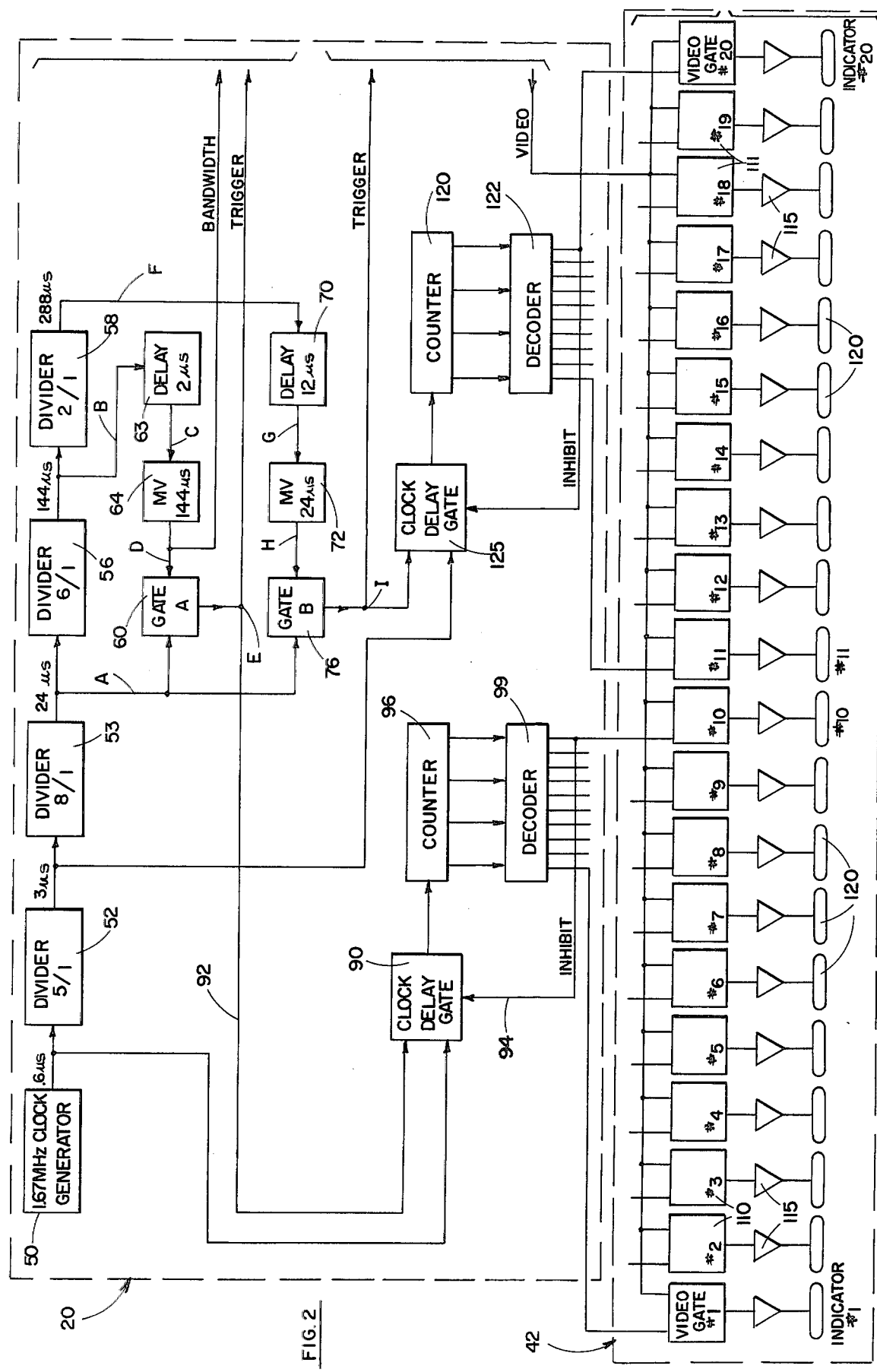
FIG. 2 is a schematic drawing indicating the clock and display units of the preferred embodiment of the invention.

Referring now to FIG. 2, a preferred embodiment of the clock circuits 20 and the range display 42 of the invention are schematically illustrated.

Clock generator 50 provides master clock pulses for the entire system and may comprise a free-running multivibrator having a 1.67 MHz output. This oscillator may be implemented to generate a pulse 100 nanoseconds wide at .6 microsecond intervals. The output of clock generator 50 is divided in a 5:1 ratio by means of divider 52, the output of which comprises pulses spaced at 3 microsecond intervals. The output of divider 52 is successively divided by 8:1 divider 53, 6:1 divider 56 and 2:1 divider 58, to produce pulses at 24, 144 and 288 microsecond intervals respectively.

Figure 3:
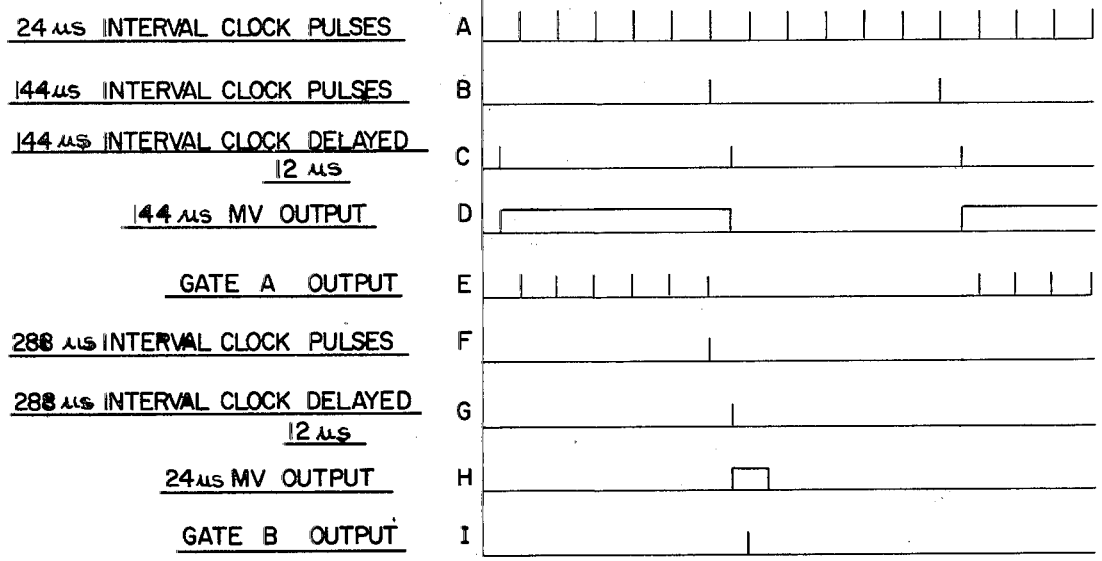
FIG. 3 is a timing diagram indicating the various pulses generated in the circuitry illustrated in FIG. 2.

Referring now additionally to FIG. 3, the generation of the various timing pulses (illustrated in FIG. 3) will now be explained. For convenience of illustration, various points in FIG. 2 have been labelled with letters to illustrate corresponding signals illustrated in FIG. 3 which are generated at these points. The 144 microsecond interval output (B) of divider 56, is fed to delay circuit 63 which delays the signal by 12 microseconds. The output (C) of delay circuit 63 is used to trigger monostable multivibrator 64, which has a 144 microsecond timing cycle, to an opposite state. The delay provided by delay circuit 63 assures that the output (D) of multivibrator 64 will bracket six of the 24 microsecond interval clock pulses.

The output (D) of multivibrator 64 is fed to gate A 60 as a gating signal therefore to gate the 24 microsecond interval output pulses (A) of divider 53 through the gate. The output (E) of gate 60 comprises groups of six trigger pulses spaced by 24 microseconds, and serve to drive pulser 22 which generates the .6 microsecond transmitter trigger pulses 30 illustrated in FIG. 4A in response to the output (E). The output (D) of multivibrator 64 also serves as a band width control signal which is fed to the radar receiver to change the band width of the I.F. stages thereof to provide a wider optimum band width during the reception of echoes from the .6 microsecond duration transmitter pulses. As illustrated in FIG. 4B, this band width may be 1.67 MHz.

The output (F) of divider 58 is delayed by means of delay circuit 70, the output (G) of which is used to drive monostable multivibrator 72. Monostable multivibrator 72 has a period of 24 microseconds and generates an output (H) which is fed as a gating signal to gate B 76. The gating signal (H) operates to gate through a single .6 microsecond pulse (I) every 288 microseconds. The output (I) of gate 76 is fed to pulser 22 which in response thereto generates the 3 microsecond transmitter trigger pulses 32, shown in FIG. 4A. It is to be noted that the 3 microsecond transmitter trigger pulses occur during the intervals when the band width control output (D) of multivibrator 64 is in the OFF or LOW state. During these intervals as indicated in FIG. 4B, the receiver intermediate frequency band width is automatically narrowed to provide optimum operation for the 3 microsecond trigger pulses (in this instance being shown to be a band width of .33 MHz).

The .6 microsecond interval pulse output of clock 50 is fed to clock delay gate 90. Also fed to this gate are the 24 microsecond interval pulses from gate 60. Clock delay gate 90 is placed in the ON state with the arrival of each 24 microsecond interval pulse on line 92 and returned to the OFF state by an inhibit signal arriving from decoder 99 on line 94. With the gate in the ON state, each pulse arriving from clock generator 50 is passed to a delay circuit incorporated in the clock delay gate. This delay circuit delays the clock pulses so as to compensate for delays in the system components and insures that the video gates will be gated ON at the proper times to provide a proper target range readout by the indicators. The delay circuit may, for example, comprise a multivibrator, the output of which has a pulse width which corresponds to the required delay. This output is differentiated and the differentiation of the trailing edge of the multivibrator output utilized as the delayed clock pulse fed to counter 96. The pulse output of gate 90 is counted in binary counter 96, the binary coded output of four bit counter 96 being fed to 4 line to 10 line decoder 99. Decoder 99 has a series of sequential outputs spaced from each other by a time interval such as to provide proper gating signals for each of the video gates 110 in succession. The video gates 110 all receive the video output of the radar receiver, the video being gated through the gates in response to the gating signals from decoder 99. The output of each of gates 110 is fed through an associated low pass filter and amplifier 115 to an associated indicator lamp 120. Thus, whenever a video signal is present at the time when any one of the video gates 110 is being gated (during a .6 microsecond time period), this video signal will be passed to an associated one of lamps 120 to actuate the lamp. Lamps 120 may comprise light emitting diode, incandescent or gas-discharge lamps. In this manner, range signals corresponding to radar echoes are displayed on the first ten indicator lamps to indicate ranges between 100 and 1000 yards. The inhibit signal on line 94 operates to inhibit the operation of clock delay gate 90 when the decoder reaches its last output (that for video gate No. 10). This inhibit signal disappears when the next 24 microsecond interval pulse arrives on line 92 and the cycle is then repeated.

Gating signals for video gates 111 (11–20) at 500 yard intervals to represent ranges of 1000–6000 yards are generated in similar fashion by means of counter 120, decoder 122, and clock delay gate 125 which are similar to the corresponding components just described. Clock delay gate 125 is adjusted so as to provide the proper delay for the 3 microsecond pulses to assure gating of video gate No. 11 at a time corresponding to the time of arrival of radar echoes from objects at 1000–1500 yards. The 3 microsecond pulses gate the various gates 111 so as to display ranges in successive 500 yard brackets.

Referring now to FIG. 5, an indicator and control unit which may be utilized in the system of the invention is illustrated. As can be seen, the indicator unit comprises a first bank of lights 130 for indicating ranges between 100 and 1100 yards, and a second bank of lights 135 for indicating ranges between 1000 and 6000 yards. A video gain control 137 is provided to enable adjustment of the video level to provide proper actuation of the lamps. Thus as can be seen, the lowermost lamp 130 indicates the presence of targets at ranges between 100 and 200 yards, the next lamp targets at 200–300 yard ranges, etc.

The system of this invention thus provides a simple, forward-looking radar which provides a light display indicating the presence of targets ahead of a vehicle such as a sailboat.

While the system of the invention has been described and illustrated in detail, it is clearly to be understood that this is intended by way of illustration and example only and is not to be taken by way of limitation, the spirit and scope of the invention being limited only by the terms of the following claims.

I claim:

1. In a radar system having a transmitter for transmitting pulses of radio frequency energy, a fixed beam antenna for radiating the output of said transmitter and a receiver for receiving echoes from objects in the path of said antenna beam, and providing video signals in accordance therewith,
   clock circuit means for generating a train of clock pulses,
   divider circuit means for dividing the frequency of said clock pulses to provide trigger pulses for pulsing said transmitter,
   counter circuit means for counting the clock pulses, the count of said counter circuit means being initiated by said trigger pulses,
   decoder circuit means having a plurality of output lines for successively providing an output pulse on each of said lines in response to the output of said counter circuit means, each of said pulses having a time relationship to said trigger pulses corresponding to a different bracket of ranges of objects in the path of the antenna beam,
   an indicator for each of said bracket of ranges, and a gate for each of said indicators,
   the video signals being fed to all of said gates and each of said decoder circuit output lines being connected to a corresponding one of said gates representing a predetermined one of said range brackets,
   whereby said indicators are actuated whenever objects are present in the path of said antenna beam within the bracket of ranges respectively associated therewith.

2. The system of claim 1 wherein said indicators are lamps.

3. The system of claim 1 wherein there are two trains of trigger pulses, one for detecting shorter range objects, the other for detecting longer range objects, there being a separate counter circuit means, decoder circuit means and set of indicators for the shorter and longer range objects respectively.

4. A radar system comprising
   a radar transmitter for transmitting pulses of radio frequency energy,
   a fixed beam antenna for radiating the output of said transmitter,
   a receiver for receiving radio frequency echoes from objects in the path of said antenna beam,
   indicator means connected to receive the output of said receiver for providing a display indicating the ranges of said echoes, said indicator means comprising a bank of indicator devices, each of said devices representing a predetermined different bracket of ranges,
   clock circuit means for generating trigger pulses for pulsing said transmitter and for generating synchronizing pulses for actuating each of said indicator devices during a time period corresponding to its respective range bracket, said clock circuit means including a clock generator for generating master clock pulses, divider means for dividing the frequency of said clock pulses to produce said trigger pulses, counter circuit means for counting said clock pulses, the count of said counter circuit means being initiated by said trigger pulses, and decoder circuit means responsive to the output of said counter circuit means for generating said synchronizing pulses for sequentially actuating said indicator devices, and
   gating means for gating video signals from said receiver to said indicator devices in sequence in response to said synchronizing pulses, said decoder circuit means having a plurality of output lines, each of said output lines being connected to a corresponding gating means and providing synchronizing pulses thereto representing one of said predetermined bracket of ranges.

5. The system of claim 4 wherein said indicator devices are indicator lamps.

6. The system of claim 4 wherein said bank of indicator devices comprises a first group of said devices for indicating shorter ranges and a second group of said devices for indicating longer ranges, there being separate trigger pulses, counter circuit means and decoder circuit means for each of said groups of indicator devices.

7. In a radar system having transmitter means for generating pulses of radio frequency energy, antenna means for radiating a fixed beam of said energy and means for receiving radio frequency echoes from objects within said beam and converting said echoes to video signals, the improvement comprising a bank of range indicator devices and means for generating signals for displaying the ranges of said objects on said bank of indicator devices,
   said signal generating means comprising a clock generator for generating master clock pulses, means for dividing the frequency of said clock pulses to provide trigger pulses for said transmitter, digital counter means for providing an output count in response to said clock pulses, the count of said counter means being initiated by said trigger pulses, decoder means responsive to the output of said counter means for producing a sequence of pulses which are time related to the trigger pulses so as to each represent a different predetermined bracket of radar ranges, and gating means for each of the range indicator devices, each of said gating means receiving all of the video signals and being gated in response to a separate one of said decoder means pulses to provide a portion of said video signals to the corresponding range indicator device representing targets within one of said range brackets.

* * * * *